(12) United States Patent
Jung et al.

(10) Patent No.: US 9,261,165 B2
(45) Date of Patent: Feb. 16, 2016

(54) TORSIONAL VIBRATION DAMPER

(75) Inventors: Stefan Jung, Kehl (DE); David Schnaedelbach, Buehl (DE); Markus Werner, Buehl (DE); Christian Huegel, Rheinau (DE); Stephan Maienschein, Baden-Baden (DE); Thorsten Krause, Buehl (DE)

(73) Assignee: Schaeffler Technologies AG & Co. KG (DE)

( * ) Notice: Subject to any disclaimer, the term of this patent is extended or adjusted under 35 U.S.C. 154(b) by 121 days.

(21) Appl. No.: 13/602,890

(22) Filed: Sep. 4, 2012

(65) Prior Publication Data

US 2013/0233125 A1 Sep. 12, 2013

Related U.S. Application Data

(63) Continuation of application No. PCT/DE2011/000197, filed on Feb. 28, 2011.

(30) Foreign Application Priority Data

| Mar. 11, 2010 | (DE) | 10 2010 011 142 |
| Jul. 15, 2010 | (DE) | 10 2010 027 404 |
| Jul. 22, 2010 | (DE) | 10 2010 031 989 |
| Nov. 18, 2010 | (DE) | 10 2010 051 860 |

(51) Int. Cl.
*F16F 15/30* (2006.01)
*F16F 15/123* (2006.01)
(Continued)

(52) U.S. Cl.
CPC .............. *F16F 15/30* (2013.01); *F16F 15/123* (2013.01); *F16F 15/145* (2013.01); *F16H 2045/0263* (2013.01); *Y10T 74/2128* (2013.01)

(58) Field of Classification Search
CPC ............ F16F 15/14; F16F 15/145; F16F 7/10; F16F 15/30; F16F 15/123; F16H 2045/0263; Y10T 74/2128
USPC ........ 74/574.2, 572.2, 572.21; 192/30 V, 205; 464/180; 188/378; 123/192.1–192.2
See application file for complete search history.

(56) References Cited

U.S. PATENT DOCUMENTS 3,681,939 A * 8/1972 Timtner et al. ................. 464/84
4,747,801 A * 5/1988 Chasseguet et al. ......... 464/66.1
(Continued)

FOREIGN PATENT DOCUMENTS

| CN | 1253246 | 5/2000 |
| CN | 1657798 | 8/2005 |

(Continued)

*Primary Examiner* — Richard W Ridley
*Assistant Examiner* — Richard Urbanski
(74) *Attorney, Agent, or Firm* — Simpson & Simpson, PLLC

(57) ABSTRACT

A torsional vibration damper for a drivetrain of a motor vehicle having a substantially discoidal centrifugal flange and a plurality of centrifugal pendulum-type absorbers. Each centrifugal pendulum-type absorber includes a first pendulum mass and a second pendulum mass. The first pendulum mass is arranged above a first surface of the pendulum flange, and the second pendulum mass is arranged above a second surface of the pendulum flange. The first pendulum mass and the second pendulum mass are firmly connected to each other by means of at least two spacing bolts in each case. The pendulum flange has a plurality of cutouts in which the spacing bolts are guided. A second spacing bolt of a first centrifugal pendulum-type absorber and a first spacing bolt of a second centrifugal pendulum-type absorber are guided in at least one first cutout.

4 Claims, 8 Drawing Sheets

(51) Int. Cl.
*F16F 15/14* (2006.01)
*F16H 45/02* (2006.01)

(56) References Cited

U.S. PATENT DOCUMENTS

| | | | |
|---|---|---|---|
| 5,819,598 A * | 10/1998 | Cooke et al. | 74/574.2 |
| 6,019,683 A | 2/2000 | Sudau | |
| 2013/0283967 A1 * | 10/2013 | Movlazada | 74/574.2 |
| 2015/0053519 A1 * | 2/2015 | Ray et al. | 188/378 |

FOREIGN PATENT DOCUMENTS

| | | | |
|---|---|---|---|
| DE | 19831156 | | 1/2000 |
| DE | 102004011830 | | 9/2004 |
| DE | 102009042831 | | 4/2010 |
| GB | 2339459 A | * | 1/2000 |
| GB | 2413614 | | 11/2005 |
| JP | 2003004101 | | 1/2003 |

* cited by examiner

TORSIONAL VIBRATION DAMPER

CROSS-REFERENCE TO RELATED APPLICATIONS

This application is filed under 35 U.S.C. §120 and §365(c) as a continuation of International Patent Application PCT/DE2011/000197, filed Feb. 28, 2011, which application claims priority from German Patent Application No. 10 2010 011 142.2, filed Mar. 11, 2010, German Patent Application No. 10 2010 027 404.6, filed Jul. 15, 2010, German Patent Application No. 10 2010 031 989.9, filed Jul. 22, 2010, and German Patent Application No. 10 2010 051 860.3, filed Nov. 18, 2010, which applications are incorporated herein by reference in their entireties.

FIELD OF THE INVENTION

The present invention relates to a torsional vibration damper.

BACKGROUND OF THE INVENTION

Torsional vibration can arise in a drivetrain of a motor vehicle. To suppress this torsional vibration, it is known to use torsional vibration dampers arranged in the drivetrain. Such torsional vibration dampers or rotational vibration dampers consist of a substantially discoidal pendulum flange on which a plurality of centrifugal pendulum-type absorbers in the form of mass elements are attached. The centrifugal pendulum-type absorbers can move in the radial direction and peripheral direction of the pendulum flange.

The pendulum flange is made to rotate by the drivetrain. The centrifugal pendulum-type absorbers are pushed radially outward, and the amount of outward-directed centrifugal force depends on the speed of the drivetrain. An uneven angular velocity of the drivetrain that, for example, is generated by the operating cycles of an internal combustion engine, causes deflections of the centrifugal pendulum-type absorbers in the circumferential direction of the pendulum flange, which attenuate the unevenness of the angular velocity of the drivetrain. Such a torsional vibration damper is, for example, known from German Patent Application No. 10 2009 042 831 A1.

When the speed and angular velocity of the drivetrain are low, the centrifugal force acting on the centrifugal pendulum-type absorbers can, in certain circumstances, be insufficient to keep the centrifugal pendulum-type absorbers in their positions radially to the outside. Under the influence of gravity, the centrifugal pendulum-type absorbers can instead shift so that neighboring centrifugal pendulum-type absorbers bump against each other. This generates noise that is perceived as annoying and problematic.

BRIEF SUMMARY OF THE INVENTION

The object of the present invention is therefore to provide an improved torsional vibration damper.

The present invention is a torsional vibration damper for a drivetrain of a motor vehicle, including a substantially discoidal centrifugal flange and a plurality of centrifugal pendulum-type absorbers. Each centrifugal pendulum-type absorber has a first pendulum mass and a second pendulum mass. The first pendulum mass is arranged above a first surface of the pendulum flange, and the second pendulum mass is arranged above a second surface of the pendulum flange. In addition, the first pendulum mass and the second pendulum mass of each centrifugal pendulum-type absorber are firmly connected to each other by means of at least two spacing bolts in each case. The pendulum flange has a plurality of cutouts in which the spacing bolts are guided, where a second spacing bolt of a first centrifugal pendulum-type absorber and a first spacing bolt of a second centrifugal pendulum-type absorber are guided in at least one first cutout. In addition, a spacing element is arranged in the first cutout that is dimensioned such that the first centrifugal pendulum-type absorber and second centrifugal pendulum-type absorber cannot contact each other. The spacing element then prevents the first centrifugal pendulum-type absorber and the second centrifugal pendulum-type absorber from impacting each other. This prevents the annoying development of noise even at low drivetrain speeds.

The spacing element is preferably arranged floating in the first cutout. The spacing element can then preferably follow the deflection of the centrifugal pendulum-type absorber.

It is also preferable for the spacing element to be flat and have basically the same thickness as the pendulum flange. The spacing element can then be preferably arranged in the first cutout and does not cause any additional friction between the spacing element and the pendulum masses of the centrifugal pendulum-type absorber.

In one embodiment, the first cut out basically has the shape of an annular sector, and the spacing element also basically has the shape of an annular sector. This is a particularly simple design of the spacing element.

In another embodiment, the spacing element has the shape of a bracket. This spacing element has particularly low mass.

It is particularly preferable for the spacing element to have the shape of a bracket open toward the midpoint of the pendulum flange. The spacing element can then preferably easily slide off a radially outer boundary edge of the first cutout.

In a further development of the invention, the spacing element has a first wing that is arranged between the second spacing bolt of the first centrifugal pendulum-type absorber and an edge of the first cutout, and also a second wing that is arranged between the first spacing bolt of the second centrifugal pendulum-type absorber and an edge of the first cutout. Preferably, in this development, no friction arises between the spacing element and the pendulum flange. In addition, only a slight amount of friction arises between the spacing element and the spacing bolt.

In another embodiment, the spacing element is designed in the shape of a circular disc. Preferably, the discoidal spacing element can then roll in the first cutout. Consequently, instead of gliding friction, only rolling friction arises in this embodiment and this is reduced compared with the gliding friction.

It is also preferable for the spacing element to not completely fill the gap between the second spacing bolt of the first centrifugal pendulum-type absorber and the first spacing bolt of the second centrifugal pendulum-type absorber when the first centrifugal pendulum-type absorber and the second centrifugal pendulum-type absorber are in a resting position. This allows a certain asynchrony between the deflections of the plurality of centrifugal pendulum-type absorbers in a peripheral direction. The circumferential pendulum-type absorbers can then move independently from each other and are not coupled, which improves the damping properties of the torsional vibration damper. In addition, the spacing bolts and the spacing element in this embodiment do not contact each other at high speeds and low torsional vibrations; consequently, no friction arises between the spacing bolts and the spacing element. In addition, friction does not arise between the spacing element and the pendulum flange in this operating state since the spacing element it is not moved in the cutout.

The torsional vibration damper can be designed as a dual-mass flywheel or as a single-stage or multistage torsional vibration damper. The torsional vibration damper can also be arranged in conjunction with a hydrodynamic torque converter or a clutch device.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
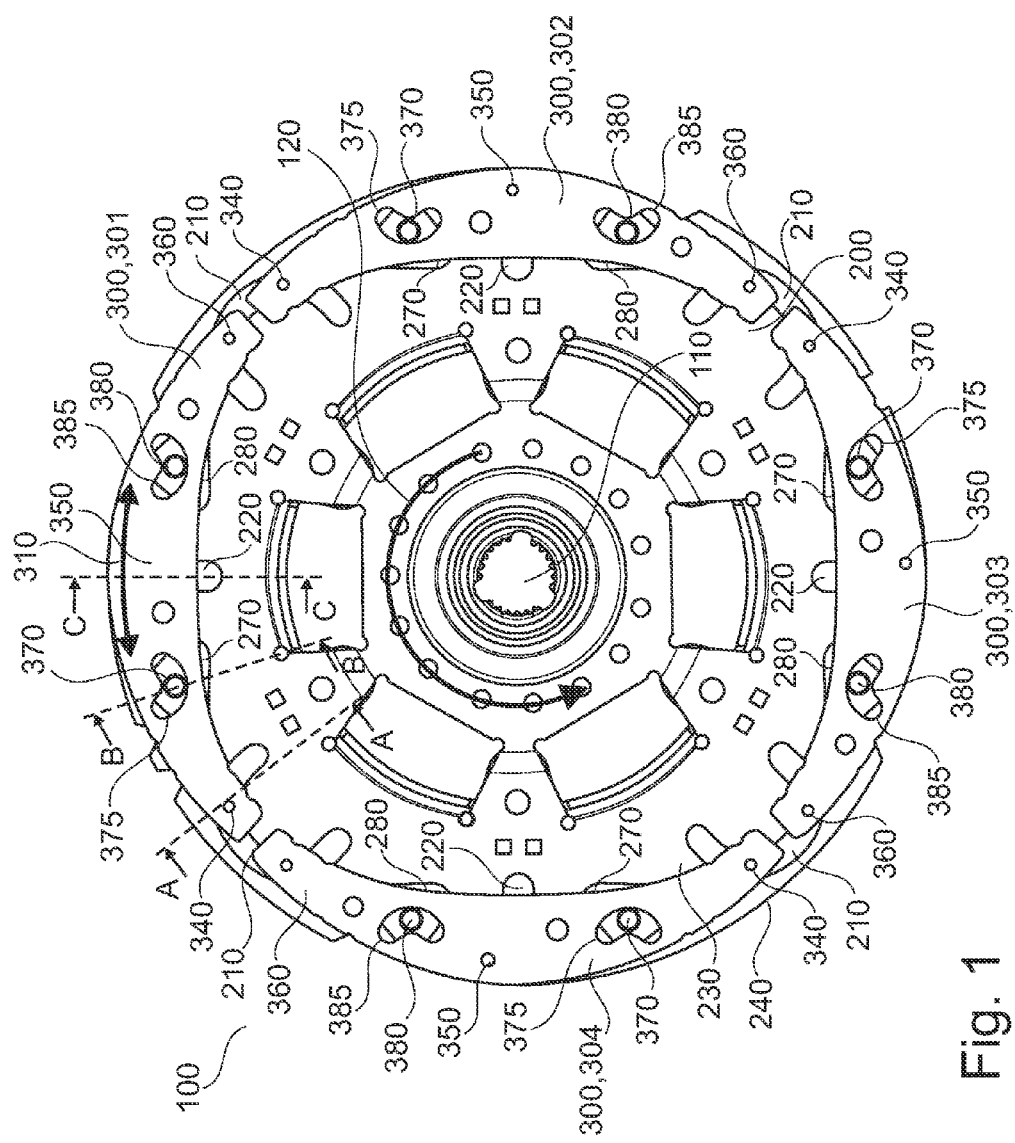
FIG. 1 is a plan view of a known torsional vibration damper.

FIG. 1 shows a plan view of known torsional vibration damper 100. Torsional vibration damper 100 generally includes discoidal first pendulum flange 200 with centrally arranged hub 110. Pendulum flange 200 can be made to rotate via hub 110 by means of a drivetrain of a motor vehicle. Rotational direction 120 indicated in FIG. 1 corresponds to a line of sight from a transmission arranged in a drivetrain of the motor vehicle toward the internal combustion engine of the motor vehicle.

Torsional vibration damper 100 serves to dampen the torsional vibrations of the drivetrain. To this end, torsional vibration damper 100 has plurality of centrifugal pendulum-type absorbers 300. In the embodiment shown in FIG. 1, there are four centrifugal pendulum-type absorbers 300, that is, first centrifugal pendulum-type absorber 301, second centrifugal pendulum-type absorber, third centrifugal pendulum-type absorber 303, and fourth centrifugal pendulum-type absorber 304. However, a different number of centrifugal pendulum-type absorbers 300 can also be provided. The centrifugal pendulum-type absorbers are designed identically.

Figure 4:
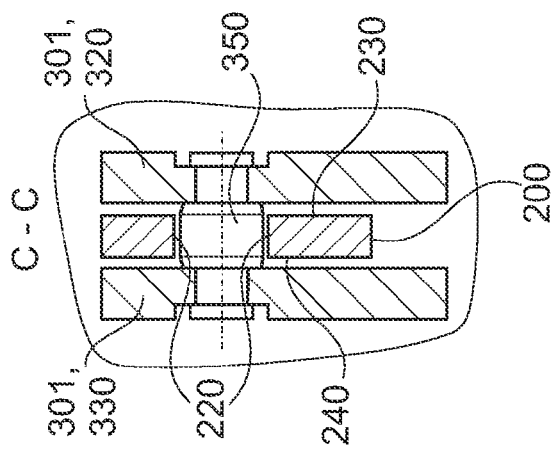
FIGS. 2 to 4 are sections of the torsional vibration damper of FIG. 1.
Figure 3:
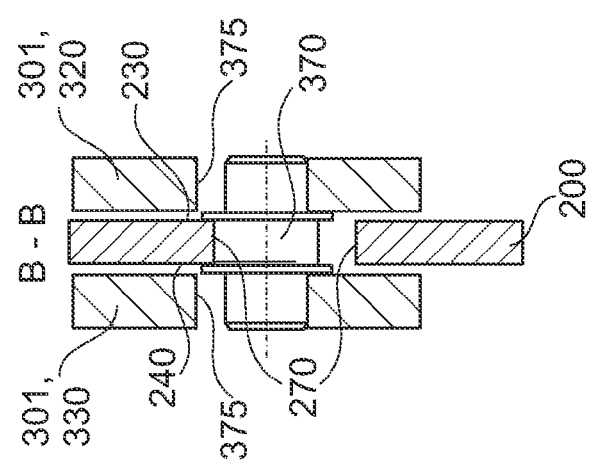
Figure 2:
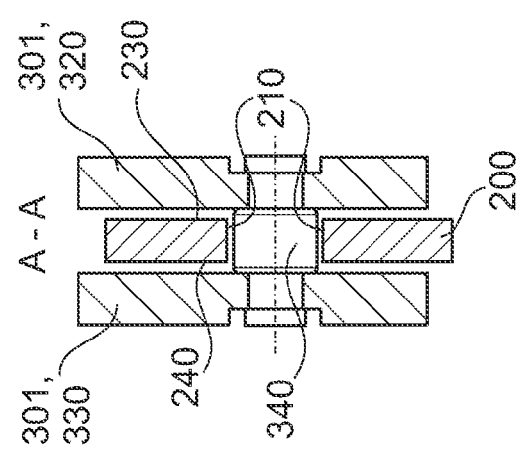

FIGS. 2 to 4 show different sections of first centrifugal pendulum-type absorber 301 and first pendulum flange 200. It can be seen in FIGS. 2 to 4 that each of centrifugal pendulum-type absorbers 300 includes first pendulum mass 320 and second pendulum mass 330. First pendulum mass 320 of each centrifugal pendulum-type absorber 300 is arranged above first surface 230 of pendulum flange 200 visible in FIG. 1. Second pendulum mass 330 of each centrifugal pendulum-type absorber 300 is arranged above rear second surface 240 of pendulum flange 200 which cannot be seen in FIG. 1.

Pendulum flange 200 of torsional vibration damper 100 has plurality of U-shaped cutouts 210, where the number of U-shaped cutouts 210 corresponds to the number of centrifugal pendulum-type absorbers 300. In the embodiment shown in FIG. 1, there are accordingly four U-shaped cutouts 210. Each U-shaped cutout 210 forms a penetration through pendulum flange 200 and is arranged so that the open side of U-shaped cutout 200 faces toward hub 110 of pendulum flange 200, whereas the closed side of U-shaped cutout 210 is oriented radially outward.

In addition, pendulum flange 200 has plurality of central cutouts 220, the number of which corresponds to the number of centrifugal pendulum-type absorbers 300. The middle cutouts are also designed as complete penetrations through pendulum flange 200. Each middle cutout 220 is arranged in a circumferential direction of pendulum flange 200 between two U-shaped cutouts 210.

In addition, pendulum flange 200 has plurality of first roller cutouts 270. The number of first roller cutouts 270 also corresponds to the number of centrifugal pendulum-type dampers 300. First roller cutouts 270 are also complete penetrations through pendulum flange 200. Each first roller cutout 270 is arranged in a circumferential direction of pendulum flange 200 between middle cutout 220 and U-shaped cutout 210.

In addition, first pendulum flange 200 has two roller cutouts 280, the number of which corresponds to the number of centrifugal pendulum-type absorbers 300. Second roller cutouts 280 are formed to symmetrically mirror first roller cutouts 270. Each second roller cutout 280 is arranged in a circumferential direction of pendulum flange 200 between middle cutout 220 and U-shaped cutout 210. Consequently, U-shaped cutout 210, first roller cutout 270, middle cutout 220, second roller cutout 280 and another U-shaped cutout 210 follow each other in a circumferential, clockwise direction of pendulum flange 200.

First pendulum mass 320 and second pendulum mass 330 of each circumferential pendulum-type absorber 300 are designed identically. Each pendulum mass 320, 330 is designed approximately in the shape of a crescent or ring sector. The angle covering the annular sector is somewhat less than 360° divided by the number of centrifugal pendulum-type absorbers 300. In the example in FIG. 1, the angle covering pendulum masses 320, 330 is, for example, somewhat less than 90°. This makes it possible to arrange individual centrifugal pendulum-type absorbers 300 at a distance from each other on the circumference of pendulum flange 200.

Each pendulum mass 320, 330 has third roller cutout 375 and fourth roller cutout 385. Third and fourth roller cutouts 375, 385 are designed as penetrations through respective pendulum mass 320, 330 and are arranged symmetrically with reference to an axis of symmetry of annular-sector-shaped pendulum masses 320, 330.

FIG. 2 shows a section of a part of torsional vibration damper 100 along the straight line AA shown in FIG. 1. It can be seen that first pendulum mass 320 and second pendulum mass 330 of first centrifugal pendulum-type absorber 301 are connected with each other firmly and at a distance by first spacing bolt 340. First spacing bolt 340 is guided through one of U-shaped cutouts 210 of pendulum flange 200. FIG. 4 shows a section through a part of torsional vibration damper 100 along the straight line CC shown in FIG. 1. In FIG. 4, it can be seen that first pendulum mass 320 and second pendulum mass 330 of first centrifugal pendulum-type absorber 301 are also firmly connected to each other by second spacing bolt 350 and run through one of middle cutouts 220 in pendulum flange 200. It can also be seen in FIG. 1 that there is third spacing bolt 360 which is symmetrically mirrored with reference to the axis of symmetry of first centrifugal pendulum-type absorber 301 and firmly connects first pendulum mass 320 and second pendulum mass 330 of first centrifugal pendulum-type absorber 301 and runs through another U-shaped cutout 210 in pendulum flange 200. In FIG. 1, it can also be seen that first spacing bolt 340 of first centrifugal pendulum-type absorber 301 and third spacing bolt 360 of neighboring second centrifugal pendulum-type absorber 302 are arranged in each of the U-shaped cutouts 210.

FIG. 3 shows a section of a part of torsional vibration damper 100 along the straight line BB shown in FIG. 1. It can be seen in FIG. 3 that first roller 370 is arranged in third roller cutout 375 of first centrifugal pendulum-type absorber 301 and one of first roller cutouts 270 of pendulum flange 200. The movement of first centrifugal pendulum-type absorber 301 relative to first pendulum flange 200 is limited in radial direction by first roller 270. It can also be seen in FIG. 1 that second roller 380 with a design corresponding to that of first roller 370 is arranged in fourth roller cutout 385 of first centrifugal pendulum-type absorber 301 and second roller cutout 280 of pendulum flange 200.

If torsional vibration damper 100 is made to rotate by the drivetrain of the motor vehicle about a rotary axis formed by hub 110, centrifugal force directed radially outward acts on centrifugal pendulum-type absorber 300 which deflects centrifugal pendulum-type absorber 300 in a radial direction until pendulum masses 320, 330 of each centrifugal pendulum-type absorber 300 contact rollers 370, 380 as shown in FIG. 3. Torsional vibration which overlaps the rotation causes centrifugal pendulum-type absorber 300 to experience deflections in the circumferential direction of pendulum flange 200. Rollers 370, 380 are thereby made to rotate and roll along the edges of cutouts 375, 385 of circumferential pendulum-type absorber 300 and the edges of cutouts 270, 280 of pendulum flange 200. The rotary motion of the overlapping torsional vibrations is dampened by this deflectability of centrifugal pendulum-type absorber 300 in the circumferential direction of pendulum flange 200. The vibrations of centrifugal pendulum-type absorbers 300 are substantially synchronized, although a certain amount of asynchrony is possible.

Figure 5:
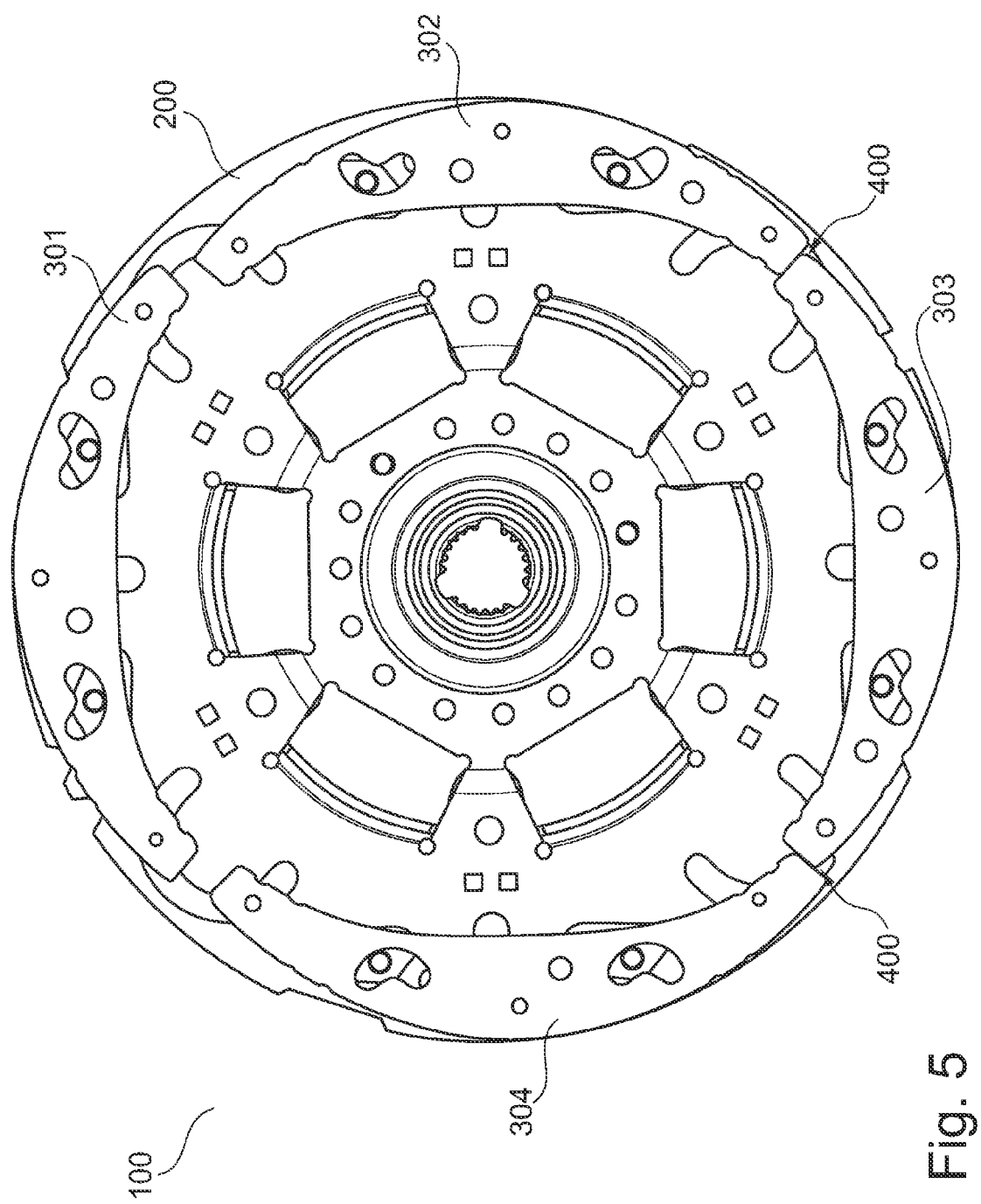
FIG. 5 is another view of the torsional vibration damper.

If the speed of the drivetrain falls below a certain minimum level which can, for example, lie around 300 rpm, the centrifugal force acting on centrifugal pendulum-type absorber 300 is no longer sufficient to completely deflect centrifugal pendulum-type absorber 300 in a radial direction. Under the influence of gravity, individual centrifugal pendulum-type absorbers 300 can collide. This is, for example, illustrated in FIG. 5 where second centrifugal pendulum-type absorber 302, third centrifugal pendulum-type absorber 303 as well as fourth centrifugal pendulum-type absorber 304 impact each other at two collision points 400. The impact of centrifugal pendulum-type absorbers 300 generates noise that is perceived as annoying.

Figure 6:
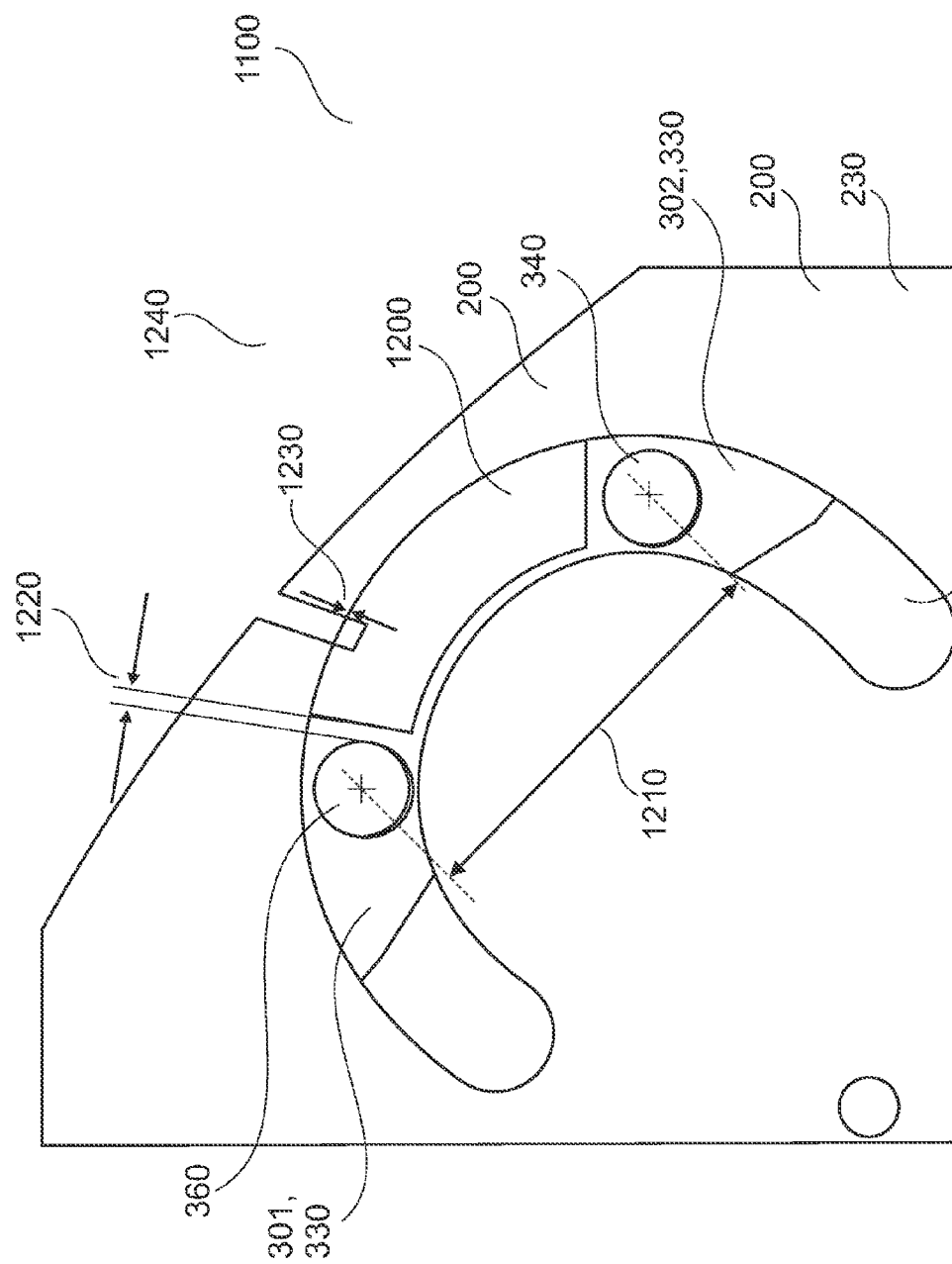
FIG. 6 shows a first embodiment of a torsional vibration damper.

FIG. 6 shows a section of a first embodiment of first torsional vibration damper 1100. FIG. 6 shows a section of first pendulum flange 200 with one of U-shaped cutouts 210, a section of second pendulum mass 330 of first centrifugal pendulum-type absorber 301 lying behind pendulum flange 200, a section of second pendulum mass 330 of second centrifugal pendulum-type absorber 302 lying behind pendulum flange 200, as well as third spacing bolt 360 of first centrifugal pendulum-type absorber 301, and first of spacing bolt 340 of second centrifugal pendulum-type absorber 302. In addition, first spacing element 1200 is arranged in U-shaped cutout 210. Like U-shaped cutout 210, first spacing element 1200 is designed approximately in the shape of an annual sector, although covering a smaller angle than U-shaped cutout 210. In a radial direction as well as in the direction between the inner and outer ring neighboring first spacing element 1200, first spacing element 1200 has a width that is slightly less than U-shaped cutout 210. In the direction perpendicular to first surface 230 of pendulum flange 200, the thickness of first spacing element 1200 is approximately the same as that of pendulum flange 200.

First spacing element 1200 is arranged between third spacing bolt 360 of first centrifugal pendulum-type absorber 301 and first spacing bolt 340 of second centrifugal pendulum-type absorber 302. The dimension of the angle covered by first spacing element 1200 is such that inner distance 1220 is formed between third spacing bolt 360 of first centrifugal pendulum-type absorber 301 and first spacing element 1200, as well as between first spacing bolt 340 of second centrifugal pendulum-type absorber 302 and first spacing element 1200 by which spacing bolts 340, 360 and first spacing element 1200 are spaced from each other when centrifugal pendulum-type absorbers 301, 302 are in their resting position. If first centrifugal pendulum-type absorber 301 and second centrifugal pendulum-type absorber 302 approach each other due to the asynchronous deflection of centrifugal pendulum-type absorbers 301, 302 in a circumferential direction of pendulum flange 200, they can only approach until spacing bolts 340, 360 come into contact with first spacing element 1200. Consequently, first spacing element 1200 always ensures minimum pendulum distance 1210 between third spacing bolt 360 of the first centrifugal pendulum-type absorber 301 and first spacing bolt 340 of second centrifugal pendulum-type absorber 302.

If first torsional vibration damper 1100 is rotating, centrifugal force 1240 acting on first spacing element 1200 causes first spacing element 1200 to contact the radially outer edge of U-shaped cutout 210. If first centrifugal pendulum-type absorber 301 and second centrifugal pendulum-type absorber 302 are deflected in the circumferential direction of pendulum flange 200, this also causes first spacing element 1200 to shift within U-shaped cutout 210 in the circumferential direction of pendulum flange 200. This causes friction to arise in friction area 1230 on the radially outer edge of U-shaped cutout 210. This friction increases with the speed of first torsional vibration damper 1100. Investigations have, however, shown that this friction does not negatively influence the functioning and transmissibility of first torsional vibration damper 1100.

Different inner distance 1220 can be chosen depending on requirements. If chosen inner distance 1220 is relatively large, the deflections of centrifugal pendulum-type absorber 300 in centrifugal-type pendulum flange 200 can be asynchronous. Centrifugal pendulum-type absorbers 300 then move independently of each other and are not coupled. At high speeds of first torsional vibration damper 1100 and at low torsional vibrations, spacing bolts 340, 360 and first spacing element 1200 do not contact each other; consequently, no friction can arise in this area either. Likewise, no friction arises between spacing element 1200 and the edges of U-shaped cutout 210 in this operating mode since first spacing element 1200 remains immovable in U-shaped cutout 210. However, chosen inner distance 1220 can be small enough to render asynchronous, lateral deflections of centrifugal pendulum-type absorber 300 impossible, and individual centrifugal pendulum-type absorbers 300 are coupled and deflected synchronously in the circumferential direction of pendulum flange 200.

Figure 7:
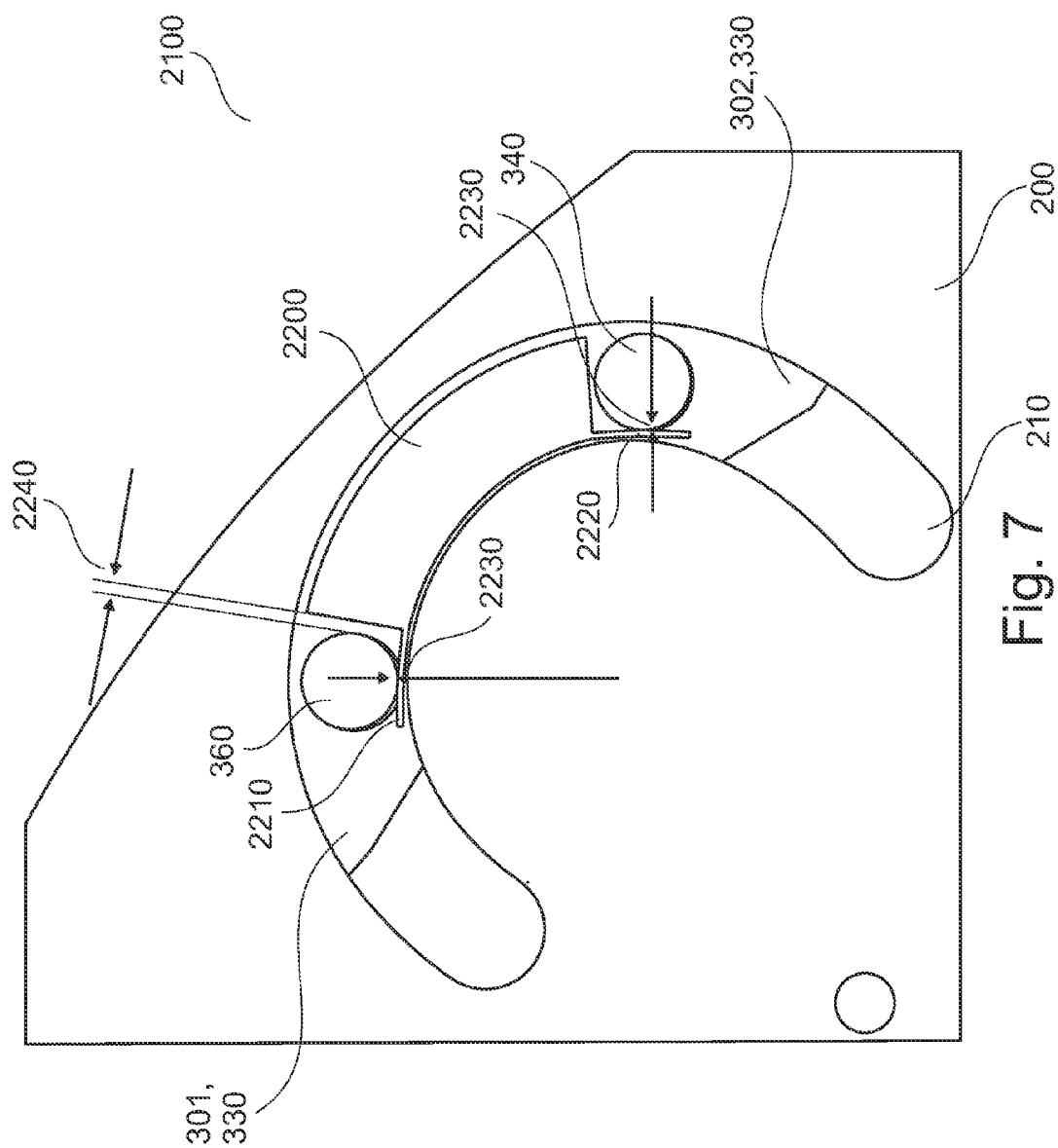
FIG. 7 illustrates a second embodiment of a torsional vibration damper.

FIG. 7 shows a section of an embodiment of a second torsional vibration damper 2100. The portrayed section corresponds to that of first torsional vibration damper 1100 of FIG. 6. However, second spacing element 2200 is provided in U-shaped cutout 210 in second torsional vibration damper 2100 instead of first spacing element 1200. In contrast to the first of spacing element 1200, second spacing element 2200 has first wing 2210 and second wing 2220. First wing 2210 extends as a projection of the outer edge radially to the inside of second spacing element 2200 between third spacing bolt 360 of first centrifugal pendulum-type absorber 301 and the radially inner edge of U-shaped cutout 210. Second wing 2220 extends as the outer edge radially to the inside of second spacing element 2200 in the area between third spacing bolt 340 of second centrifugal pendulum-type absorber 302 and the radially inner edge of U-shaped cutout 210. Wings 2210, 2220 are therefore substantially perpendicular to the radial marginal surfaces of second spacing element 2200. Wings 2210, 2220 of second spacing element 2200 prevent second spacing element 2200 from being deflected against the radial outer edge of U-shaped cutout 210 even under the influence of centrifugal force acting on second spacing element 2200. Instead, wings 2210, 2220 contact spacing bolts 340, 360 under the influence of centrifugal force acting radially to the outside. Consequently, friction is also prevented from arising between second spacing element 2200 and first pendulum flange 200. A slight amount of friction only arises in friction area 2230 between wings 2210, 2220 and spacing bolts 340, 360. With reference to chosen inner distance 2240 between the section of spacing element 2200 in the shape of the annular sector and spacing bolts 340, 360 the aforementioned relating to spacing element 1200 in FIG. 6 apply.

Figure 8:
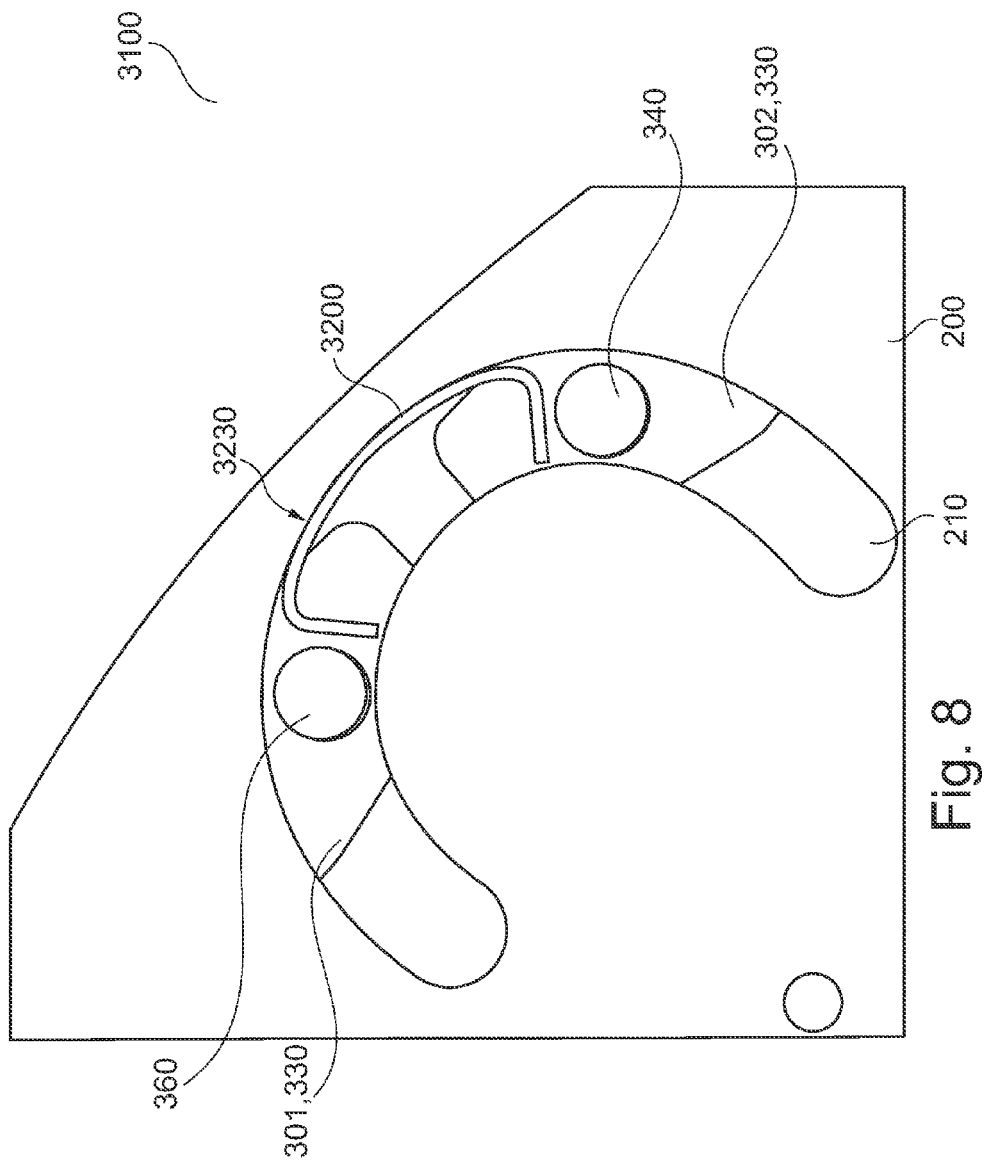
FIG. 8 depicts a third embodiment of a torsional vibration damper.

FIG. 8 shows a section of an embodiment of a third torsional vibration damper 3100. Instead of first spacing element 1200 of first torsional vibration damper 1100 in FIG. 6, third torsional vibration damper 3100 has third spacing element 3200. The outer contour of third spacing element 3200 is also in the shape of an annular sector and corresponds to that of first spacing element 1200. However, in comparison to first spacing element 1200, the radially inner marginal edge and the majority of the surface area of third spacing element 3200 have been removed so that only the radially outer marginal edge and the two radial marginal edges remain. Overall, third spacing element 3200 has the shape of a bracket with an open side facing toward the center of pendulum flange 200. In comparison to first spacing element 1200, third spacing element 3200 has less mass. In addition, the bracket-like shape of third spacing element 3200 lends elasticity to third spacing element 3200. This elasticity can dampen the impact of spacing bolts 340, 360 with third spacing element 3200, thereby additionally reducing noise. As is the case with first spacing element 1200, friction can arise in radially outer friction area 3230 between third spacing element 3200 and the radially outer edge of U-shaped cutout 210 which, however, has not proven to be problematic.

Figure 9:
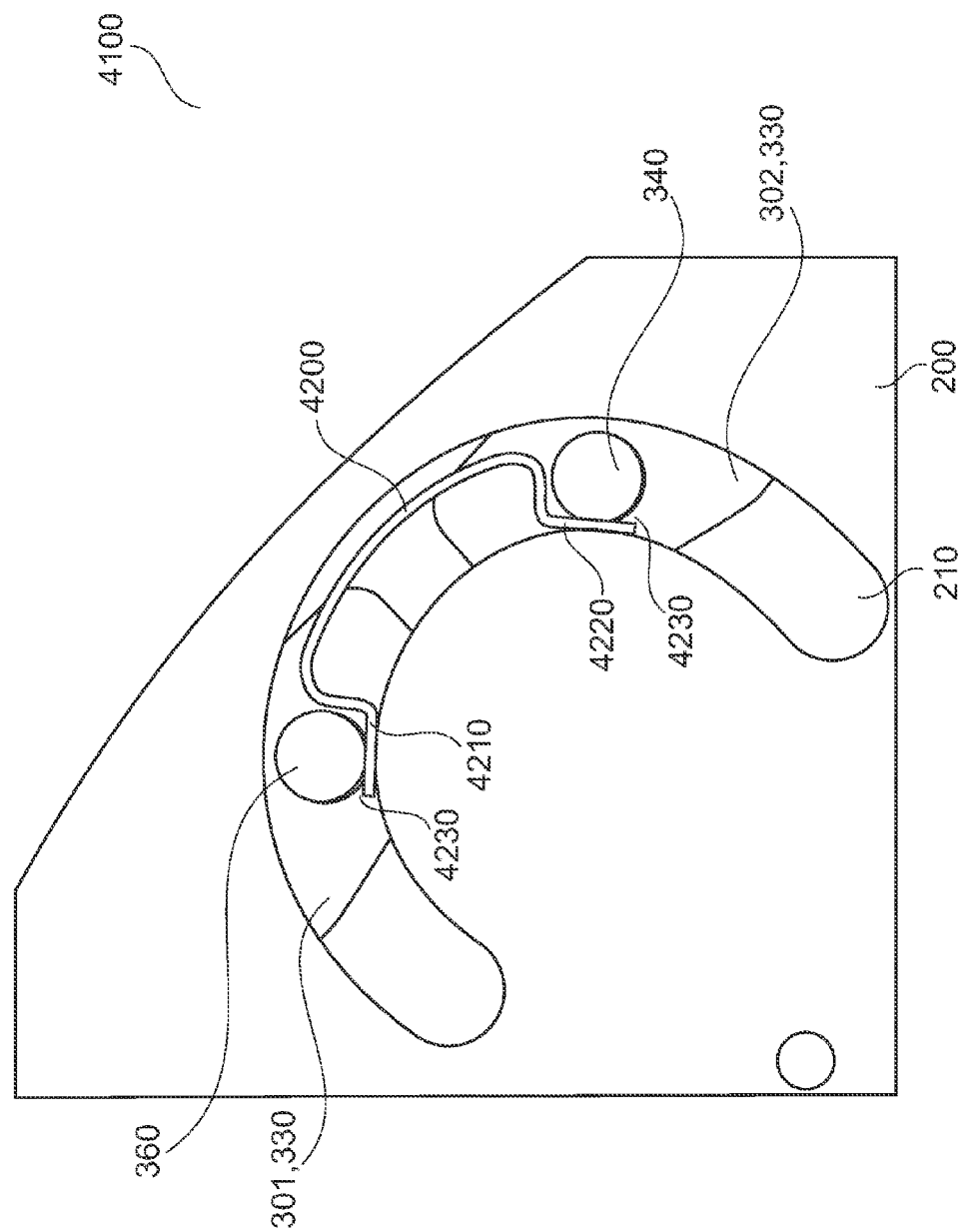
FIG. 9 shows a fourth embodiment of a torsional vibration damper.

FIG. 9 shows a section of an embodiment of a fourth torsional vibration damper 4100. Instead of first spacing element 1200 of the first torsional vibration damper, the fourth torsional vibration damper has fourth spacing element 4200 arranged in U-shaped cutout 210. Fourth spacing element 4200 is the same as third spacing element 3200 of third torsional vibration damper 3100, however in contrast to thereto, it has third wing 4210 and fourth wing 4220 like second spacing element 2200 of second torsional vibration damper 2100. Third wing 4210 extends from one of the radial side edges of fourth spacing element 4200 in an area of U-shaped cutout 210 lying between third spacing bolt 360 of first centrifugal pendulum-type absorber 301 and the radially inner edge of U-shaped cutout 210. Fourth leg 4220 correspondingly extends from the opposite radial outer edge of fourth spacing element 4200 in an area of U-shaped cutout 210 that lies between the radially inner marginal edge of U-shaped cutout 210 and first spacing bolt 340 of second centrifugal pendulum-type absorber 302. Overall, fourth spacing element 4200 consequently has a shape reminiscent of the Greek capital letter omega. As is the case with second spacing element 2200 of second torsional vibration damper 2100, wings 4210, 4220 of fourth spacing element 4200 prevent fourth spacing element 4200 from contacting the radially outer edge of U-shaped cutout 210 even under the influence of centrifugal force acting radially to the outside; consequently, no friction can arise there either. Instead, there is slight friction only in friction areas 4230 between wings 4210, 4220 and spacing bolts 340, 360.

Figure 10:
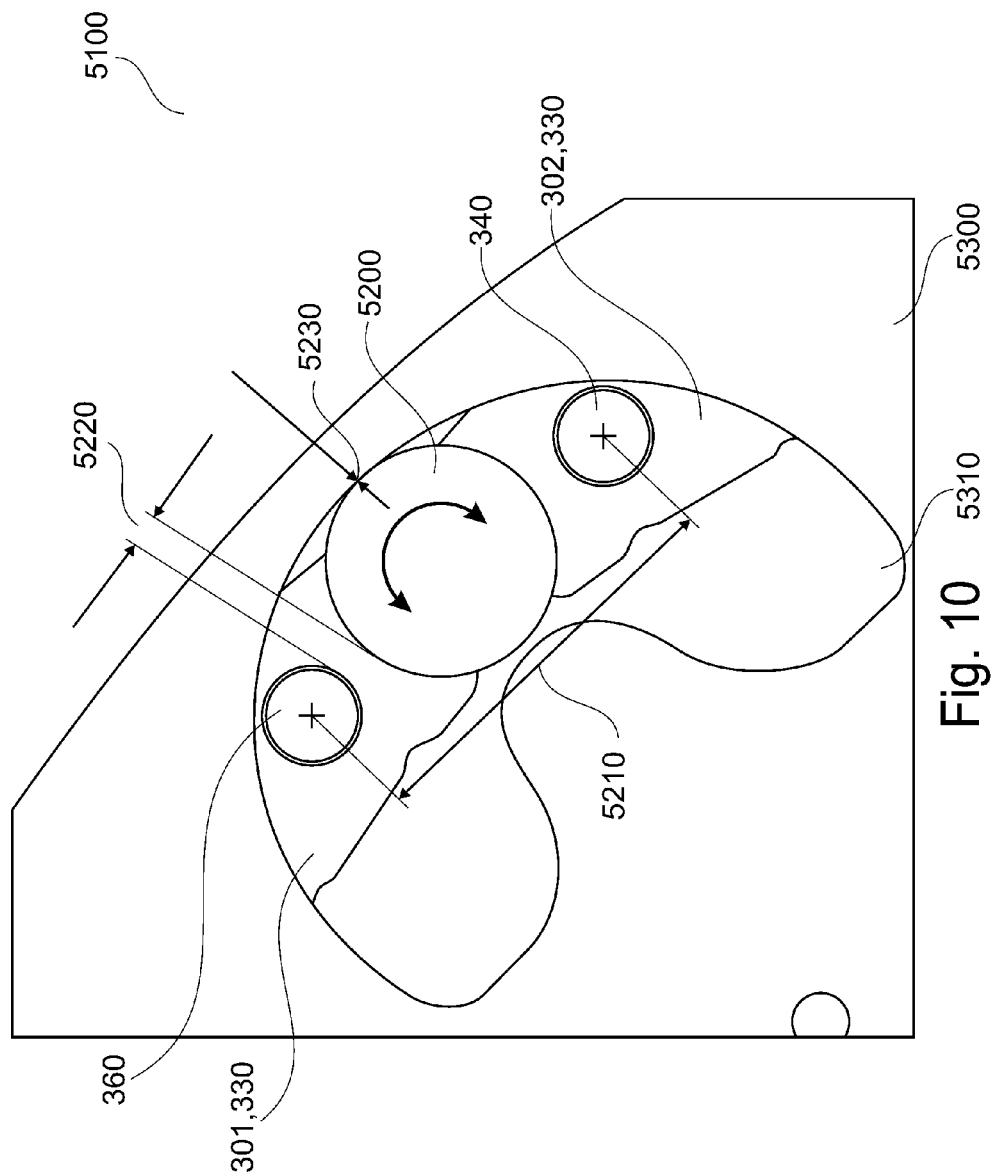
FIG. 10 illustrates a fifth embodiment of a torsional vibration damper.

FIG. 10 shows a section of an embodiment of a fifth torsional vibration damper. Instead of first pendulum flange 200, fifth torsional vibration damper 5100 has second pendulum flange 5300 that has wider U-shaped cutout 5310 instead of U-shaped cutout 210. In comparison to U-shaped cutout 210, wider U-shaped cutout 5100 is designed wider so that the difference between the outer radius and inner radius of the cutout is greater. Third spacing bolt 360 of first centrifugal pendulum-type absorber 301 and first spacing bolt 340 of second centrifugal pendulum-type absorber 302 are guided in wider U-shaped cutout 5310. In addition, fifth spacing element is arranged 5200 in wider cutout 5310 between spacing bolts 340, 360 and is designed as a circular disc in this embodiment. The diameter of the circular disc is slightly less than the difference between the outer diameter and the inner diameter of cutout 5310. Fifth spacing element 5200 prevents first centrifugal pendulum-type absorber 301 from impacting second centrifugal pendulum-type absorber 302 since spacing bolts 340, 360 contact fifth spacing element 5200 before centrifugal pendulum-type absorbers 5200 contact. If centrifugal pendulum-type absorbers 301, 302 are in a resting position, inner distance 5220 arises between fifth spacing element 5200 and spacing bolts 340, 360 which prevents centrifugal pendulum-type absorbers 301, 302 from contacting. The diameter of fifth spacing element 5200 in the shape of an annular segment and inner distances 5220 can be chosen to ensure that third spacing bolt 360 of first centrifugal pendulum-type absorber 301 and first spacing bolt 340 of second centrifugal pendulum-type absorber 302 always maintain minimum pendulum distance 5210. The advantage of designing fifth spacing element 5200 as a circular disc is that fifth spacing element 5200 can roll on the edges of wider U-shaped cutout 5110. Consequently, instead of sliding friction, reduced rolling friction can arise between fifth spacing element 5200 and the edges at second pendulum flange 5300 bordering wider U-shaped cutout 5310.

Instead of the embodiments of spacing elements 1200, 2200, 3200, 4200, 5200 shown in FIGS. 6 to 10, a spacing element can be used with a different shape.

Instead of the spacing elements, shortening pendulum masses 320, 330 of centrifugal pendulum-type absorber 300 can prevent centrifugal pendulum-type absorber 300 from being hit. This would however also reduce the mass of centrifugal pendulum-type absorber 300 which would reduce the damping properties of the torsional vibration damper. In addition, spacing bolts 340, 360 of centrifugal pendulum-type absorber 300 would then hit pendulum flange 200, 5300.

The invention can be used for all torsional vibration dampers in which the outer spacing bolts of two centrifugal pendulum-type absorbers are guided in a common cutout.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

100 Familiar torsional vibration damper
110 Hub
120 Direction of rotation
200 First pendulum flange
210 U-shaped cutout
220 Middle cutout
230 First surface
240 Second surface
270 First roller cutout
280 Second roller cutout
300 Centrifugal pendulum-type absorber
301 First centrifugal pendulum-type absorber
302 Second centrifugal pendulum-type absorber
303 Third centrifugal pendulum-type absorber
304 Fourth centrifugal pendulum-type absorber
310 Direction of pendulum motion
320 First pendulum mass
330 Second pendulum mass
340 First spacing bolt
350 Second spacing bolt
360 Third spacing bolt
370 First roller
375 Third roller cutout
380 Second roller
385 Fourth roller cutout
400 Collision point
1100 First torsional vibration damper
1200 First spacing element
1210 Pendulum distance
1220 Inner distance
1230 Friction area
1240 Centrifugal force
2100 Second torsional vibration damper
2200 Second spacing element
2210 First wing
2220 Second wing
2230 Friction area
2240 Inner distance
3100 Third torsional vibration damper
3200 Third spacing element
3230 Friction area
4100 Fourth torsional vibration damper
4200 Fourth spacing element
4210 Third wing
4220 Fourth wing
4230 Friction area
5100 Fifth torsional vibration damper
5200 Fifth spacing element
5210 Pendulum distance
5220 Inner distance
5230 Friction area
5300 Second pendulum flange
5310 Wider U-shaped cutout

What is claimed is:

1. A torsional vibration damper for a drivetrain of a motor vehicle, comprising:
a discoidal pendulum flange; and,
a plurality of centrifugal pendulum-type absorbers, wherein each centrifugal pendulum-type absorber comprises:
a first pendulum mass; and,
a second pendulum mass, wherein the first pendulum mass is arranged on a first surface of the pendulum flange, the second pendulum mass is arranged on a second surface of the pendulum flange, and the first pendulum mass and the second pendulum mass are connected to each other by means of at least two respective spacing bolts, wherein the pendulum flange has a plurality of cutouts in which the at least two respective spacing bolts for said each centrifugal pendulum-type absorber are guided, wherein a first respective spacing bolt of the at least two respective spacing bolts of a first centrifugal pendulum-type absorber of the plurality of centrifugal pendulum-type absorbers and a second respective spacing bolt of the at least two respective spacing bolts of a second centrifugal pendulum-type absorber of the plurality of centrifugal pendulum-type absorbers are guided in at least one first cutout of the plurality of cutouts, wherein a spacing element is arranged in the first cutout, and the spacing element is dimensioned so that the first centrifugal pendulum-type absorber and the second pendulum-type absorber cannot contact each other, wherein the first cutout has the shape of a crescent, and wherein the spacing element has a first wing that is arranged between the first respective spacing bolt of the first centrifugal pendulum-type absorber and an edge of the first cutout, and the spacing element has a second wing that is arranged between the second respective spacing bolt of the second centrifugal pendulum-type absorber and the edge of the first cutout.

2. The torsional vibration damper as recited in claim 1, wherein the spacing element is arranged floating in the first cutout.

3. The torsional vibration damper as recited in claim 1, wherein the spacing element is flat and has substantially the same thickness as the pendulum flange.

4. The torsional vibration damper as recited in claim 1, wherein the spacing element does not completely fill the space between the first respective spacing bolt of the first centrifugal pendulum-type absorber and the second respective spacing bolt of the second centrifugal pendulum-type absorber when the first centrifugal pendulum-type absorber and the second centrifugal pendulum-type absorber are in a resting position.

\* \* \* \* \*